(12) United States Patent
Yannuzzi et al.

(10) Patent No.: US 11,829,924 B2
(45) Date of Patent: Nov. 28, 2023

(54) ITEM IDENTITY FEDERATION AND VISIBILITY AS A SERVICE USING A DATA SHARING POLICY DETERMINED BASED ON A VISIBILITY OFFERING AND A VISIBILITY INTENT

(71) Applicant: Cisco Technology, Inc., San Jose, CA (US)

(72) Inventors: Marcelo Yannuzzi, Nuvilly (CH); Joel Abraham Obstfeld, Bushey (GB); Franciscus Johannes Marcellus van Lingen, Gland (CH); Anuj Jain, Gland (CH)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 17/147,152

(22) Filed: Jan. 12, 2021

(65) Prior Publication Data

US 2022/0222609 A1    Jul. 14, 2022

(51) Int. Cl.
*G06Q 10/083* (2023.01)
*G06Q 10/0637* (2023.01)
*G06Q 10/087* (2023.01)

(52) U.S. Cl.
CPC ....... *G06Q 10/083* (2013.01); *G06Q 10/0637* (2013.01); *G06Q 10/087* (2013.01)

(58) Field of Classification Search
CPC .. G06Q 10/087; G06Q 10/0833; G06Q 50/28; G06Q 10/08; H04L 67/00; H04L 12/66; H04L 67/51; H04L 41/0853; H04L 63/20; H04L 67/34
See application file for complete search history.

(56) References Cited

U.S. PATENT DOCUMENTS

| | | | |
|---|---|---|---|
| 5,974,395 A * | 10/1999 | Bellini | G06Q 10/087 705/28 |
| 7,392,255 B1 * | 6/2008 | Sholtis | G06F 16/256 707/999.203 |
| 7,610,390 B2 | 10/2009 | Yared et al. | |

(Continued)

OTHER PUBLICATIONS

Grummt, Eberhard et al., Fine-Grained Access Control for EPC Information Services The Internet of Things, First Conference, IOT2008, Mar. 2008 (Year: 2008).*

(Continued)

*Primary Examiner* — Scott L Jarrett
(74) *Attorney, Agent, or Firm* — BEHMKE INNOVATION GROUP LLC; Kenneth J. Heywood; James J. Wong

(57) ABSTRACT

According to one or more embodiments of the disclosure, a service deploys a first service connector to a first deployment network of a first organization and a second service connector to a second deployment network of a second organization. The service receives a selected visibility offering by the first organization and a selected visibility intent for the second organization. The service determines a data sharing policy by matching the selected visibility offering by the first organization to the selected visibility intent for the second organization. The service configures the first service connector to capture data specified by the data sharing policy from the first deployment network and provide that data to the second service connector.

17 Claims, 6 Drawing Sheets

(56) References Cited

U.S. PATENT DOCUMENTS

| | | | | |
|---|---|---|---|---|
| 7,657,777 | B2* | 2/2010 | Wong | G06Q 10/087 707/791 |
| 7,866,543 | B2* | 1/2011 | Asher | G06Q 10/10 235/385 |
| 8,170,900 | B2* | 5/2012 | Young | G06Q 10/08 709/230 |
| 8,348,160 | B2* | 1/2013 | Asher | G06Q 10/08 235/375 |
| 8,375,213 | B2 | 2/2013 | Borneman et al. | |
| 8,527,539 | B2* | 9/2013 | Traub | G06F 21/6218 707/781 |
| 8,555,398 | B2* | 10/2013 | Winkler | G06Q 30/06 726/20 |
| 8,639,825 | B2* | 1/2014 | Winkler | G06Q 10/06 705/28 |
| 9,015,297 | B2* | 4/2015 | Putman | H04L 9/40 709/223 |
| 9,116,969 | B2* | 8/2015 | Dogaru | G06F 16/258 |
| 9,159,046 | B2 | 10/2015 | Kerschbaum | |
| 9,202,194 | B1* | 12/2015 | Mistry | G06Q 10/0833 |
| 9,529,635 | B2* | 12/2016 | Werth | G06F 9/5072 |
| 9,576,264 | B2* | 2/2017 | Bolene | G16H 40/20 |
| 10,206,096 | B2* | 2/2019 | Stafford | H04L 65/1104 |
| 10,798,084 | B1* | 10/2020 | Rose | H04L 63/20 |
| 10,986,132 | B2* | 4/2021 | Tannu | H04L 63/102 |
| 11,159,517 | B2* | 10/2021 | Jain | H04L 63/0815 |
| 11,582,106 | B2* | 2/2023 | Hameiri | H04L 67/133 |
| 2002/0029201 | A1* | 3/2002 | Barzilai | G06F 21/6245 705/26.1 |
| 2002/0158898 | A1* | 10/2002 | Hsieh | G06F 8/61 715/736 |
| 2003/0014270 | A1* | 1/2003 | Qureshi | G06Q 10/08 705/26.1 |
| 2003/0028625 | A1* | 2/2003 | Sanjeev | H04L 67/34 709/250 |
| 2004/0153547 | A1* | 8/2004 | Trossen | H04L 67/51 709/228 |
| 2006/0020498 | A1* | 1/2006 | Aitipamula | G06Q 10/08 705/28 |
| 2006/0069813 | A1* | 3/2006 | Biamonte | G06F 9/4415 710/8 |
| 2007/0294101 | A1* | 12/2007 | Dalal | G16H 20/13 705/28 |
| 2008/0086564 | A1* | 4/2008 | Putman | H04L 67/51 709/227 |
| 2008/0109411 | A1* | 5/2008 | Young | G06Q 10/08 |
| 2008/0157933 | A1* | 7/2008 | Winkler | G06Q 10/08 340/10.6 |
| 2010/0146047 | A1* | 6/2010 | Grieder | G06Q 50/01 709/204 |
| 2010/0329464 | A1* | 12/2010 | Kerschbaum | G06Q 10/087 726/28 |
| 2012/0232945 | A1* | 9/2012 | Tong | G06Q 10/08 705/7.15 |
| 2013/0254882 | A1 | 9/2013 | Kannappan et al. | |
| 2013/0297929 | A1* | 11/2013 | Chaves | H04L 9/0844 713/150 |
| 2015/0319253 | A1* | 11/2015 | Sun | H04L 67/00 709/226 |
| 2016/0070758 | A1* | 3/2016 | Thomson | G16H 10/60 707/781 |
| 2019/0087598 | A1* | 3/2019 | Adkins | H04L 9/0643 |
| 2020/0267555 | A1 | 8/2020 | Grayson et al. | |
| 2020/0366716 | A1 | 11/2020 | Singh et al. | |
| 2021/0081557 | A1* | 3/2021 | Thomson-Wood | G06F 21/6218 |
| 2021/0119804 | A1* | 4/2021 | Ow | G06Q 30/04 |
| 2021/0132962 | A1* | 5/2021 | Makhija | G06F 9/454 |
| 2021/0226774 | A1* | 7/2021 | Padmanabhan | H04L 9/3239 |
| 2021/0294914 | A1* | 9/2021 | Nagano | G06F 21/645 |
| 2021/0389945 | A1* | 12/2021 | Teraoka | G06F 21/57 |
| 2022/0029886 | A1* | 1/2022 | Hameiri | H04L 41/0856 |
| 2022/0188763 | A1* | 6/2022 | Mallers | G06Q 10/0833 |

OTHER PUBLICATIONS

Pardal, Miguel L. et al., Access Control Policies for Traceability Information Systems International Journal of Computer Information Systems and Industrial Management Applications, vol. 6, 2014 (Year: 2014).*

Kurschenr Chris et al., Discovery Service Design in the EPCGlobal Network—Towards Full Supply Chain Visibility The Internet of Things, First Conference, IOT2008, Mar. 2008 (Year: 2008).*

Musa, Ahmed et al., Supply chain product visibility: Methods, systems and impacts Expert Systems with Applications, vol. 41, 2014 (Year: 2014).*

Global Standards for Supply Chain Data Visibility USAID Global Health Supply Chain Program, 2020 (Year: 2020).*

"GS1 System Architecture Document: How GS1 Standards Fit Together", Release 9.0, Approved Feb. 2020, 48 pages, GS1 AISBL.

Huhtanen, et al., "ICT SHOK Future Internet Testbed Architecture v1.0", online: http://www.futureinternet.fi/publications/ict-shok-fi-testbed-architecture-2009-12-23.pdf, Dec. 2009, 27 pages.

"Identity Federation", online: https://gif.grena.ge/eng/main/index/2, 2016, 1 page, Georgian Research and Educational Networking Association.

"ACOnet Identity Federation", online: https://www.aco.net/federation.html?&L=1, Sep. 2019, 2 pages, Austrian Academic Computer Network.

"The Cloud as a Platform", online: https://vemendo.se/en/the-cloud-as-a-platform/, printed Dec. 8, 2020, 5 pages, Vemendo.

"ownCloud", online: https://owncloud.com/product/, printed Dec. 8, 2020, 23 pages, ownCloud GmbH.

"The Trusted Digital Identity for e-Health", online: https://www.trustid.ch/en/trustid-healthcare, printed Dec. 8, 2020, 11 pages, trustID, Switzerland.

"My Digital Identity", online: https://issuu.com/ringier-brandstudio/docs/swissid_en, Jan. 2020, 20 pages, SwissID, Switzerland.

"WS-Federation", online: https://docs.oracle.com/cd/E19316-01/820-3886/ghhtc/index.html, printed Dec. 8, 2020, 19 pages, Oracle Corporation.

United Security Providers, online: https://www.united-security-providers.com/about-us, printed Dec. 8, 2020, 7 pages, Switzerland.

"IOT Asset Tracking", online: https://radiantrfid.com/asset-tracking/?cn-reloaded=1, printed Dec. 8, 2020, 11 pages, Radiant RFID, LLC.

"Virtual Asset Tracker", online: https://radiantrfid.com/virtual-asset-tracker/, 8 pages, , Radiant RFID, LLC.

"Video: Virtual Asset Tracker Overview", online: https://radiantrfid.com/2016/07/26/video-virtual-asset-tracker-overview/, printed Dec. 8, 2020, Radiant RFID, LLC.

"Federated Identity", online: https://en.wikipedia.org/wiki/Federated_identity, Nov. 28, 2020, 7 pages, Wikimedia Foundation, Inc.

Aguiar, Luiza, "New RSA Solutions Hit the Starting Blocks in Race to Adaptive Identity and Access Management", online: https://www.delltechnologies.com/en-us/blog/new-rsa-solutions-hit-the-starting-blocks-in-race-to-adaptive-identity-and-access-management/, May 2013, 7 pages, Dell Inc.

* cited by examiner

Set policy - M - Manufacturer  RFID

ADD POLICY

Apply policy to devices }504
- ☐ Owned by our organisation
- ☒ Owned by 3rd party

Send Policy }506
- ☒ Notify arrival
- ☒ Notify departure
- ☐ In stock query
- ☐ Quantity in stock query

Receive Policy }508
- ☒ ETD updates
- ☒ Asset description
- ☒ Asset State

SAVE  CANCEL

Set policy - W - Warehouse  RFID

ADD POLICY

Apply policy to devices }514
- ☒ Owned by our organisation
- ☐ Owned by 3rd party

Send Policy }516
- ☒ ETD updates
- ☒ Asset Description
- ☐ Asset state

Receive Policy }518
- ☒ Notify arrival
- ☒ Notify departure
- ☒ In stock query
- ☒ Quantity in stock query

SAVE  CANCEL

ITEM IDENTITY FEDERATION AND VISIBILITY AS A SERVICE USING A DATA SHARING POLICY DETERMINED BASED ON A VISIBILITY OFFERING AND A VISIBILITY INTENT

TECHNICAL FIELD

The present disclosure relates generally to computer networks, and, more particularly, to item identity federation and visibility as a service.

BACKGROUND

Modern supply chains typically span multiple organizations, such as the shipper of an item, any number of carriers, and the target destination of the item. As the item travels towards its destination, its digital representation may undergo a number of transformations. For instance, the identity of the item under the responsibility of a first carrier is likely to be different than the identity of the same item under the responsibility of a second carrier.

Even within a single organization, the identification of a particular item may vary due to the different technologies that shippers may employ. For instance, an item may be tagged using a barcode, a Quick Response (QR) code, radio frequency identification (RFID) tag, Bluetooth Low Energy (BLE) tag, cellular tag, or the like. It is also quite common for an item to be re-tagged when passing from one carrier to another (e.g., the new carrier puts a new barcode on the item being shipped). In doing so, this effectively changes the digital identity of the item. As a result, supply chains that span multiple organizations often lack end-to-end transparency.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5B illustrate examples of preference selection; and

DESCRIPTION OF EXAMPLE EMBODIMENTS

Overview

Figure 1:
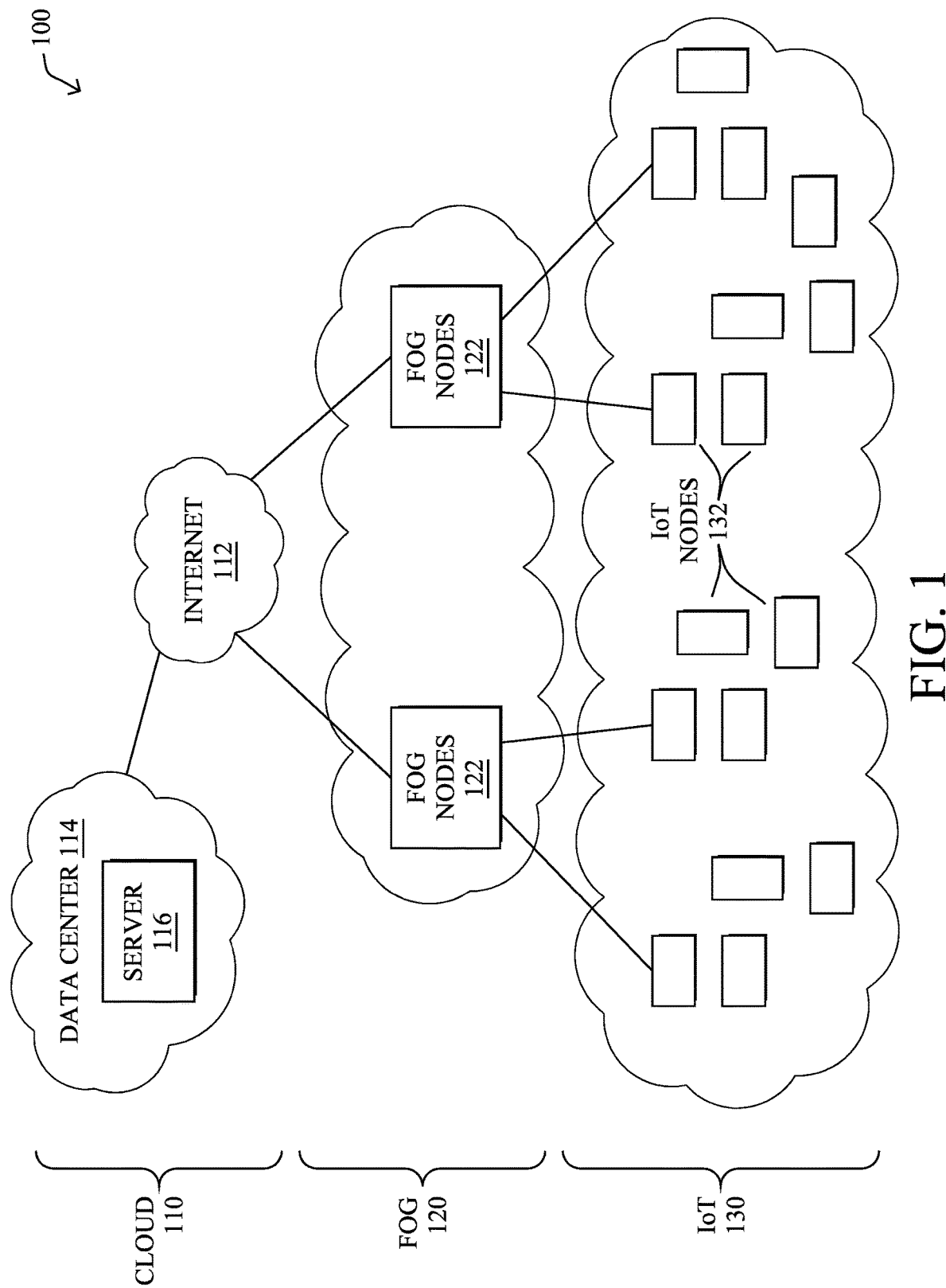
FIG. 1 illustrates an example network.

According to one or more embodiments of the disclosure, a service deploys a first service connector to a first deployment network of a first organization and a second service connector to a second deployment network of a second organization. The service receives a selected visibility offering by the first organization and a selected visibility intent for the second organization. The service determines a data sharing policy by matching the selected visibility offering by the first organization to the selected visibility intent for the second organization. The service configures the first service connector to capture data specified by the data sharing policy from the first deployment network and provide that data to the second service connector.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
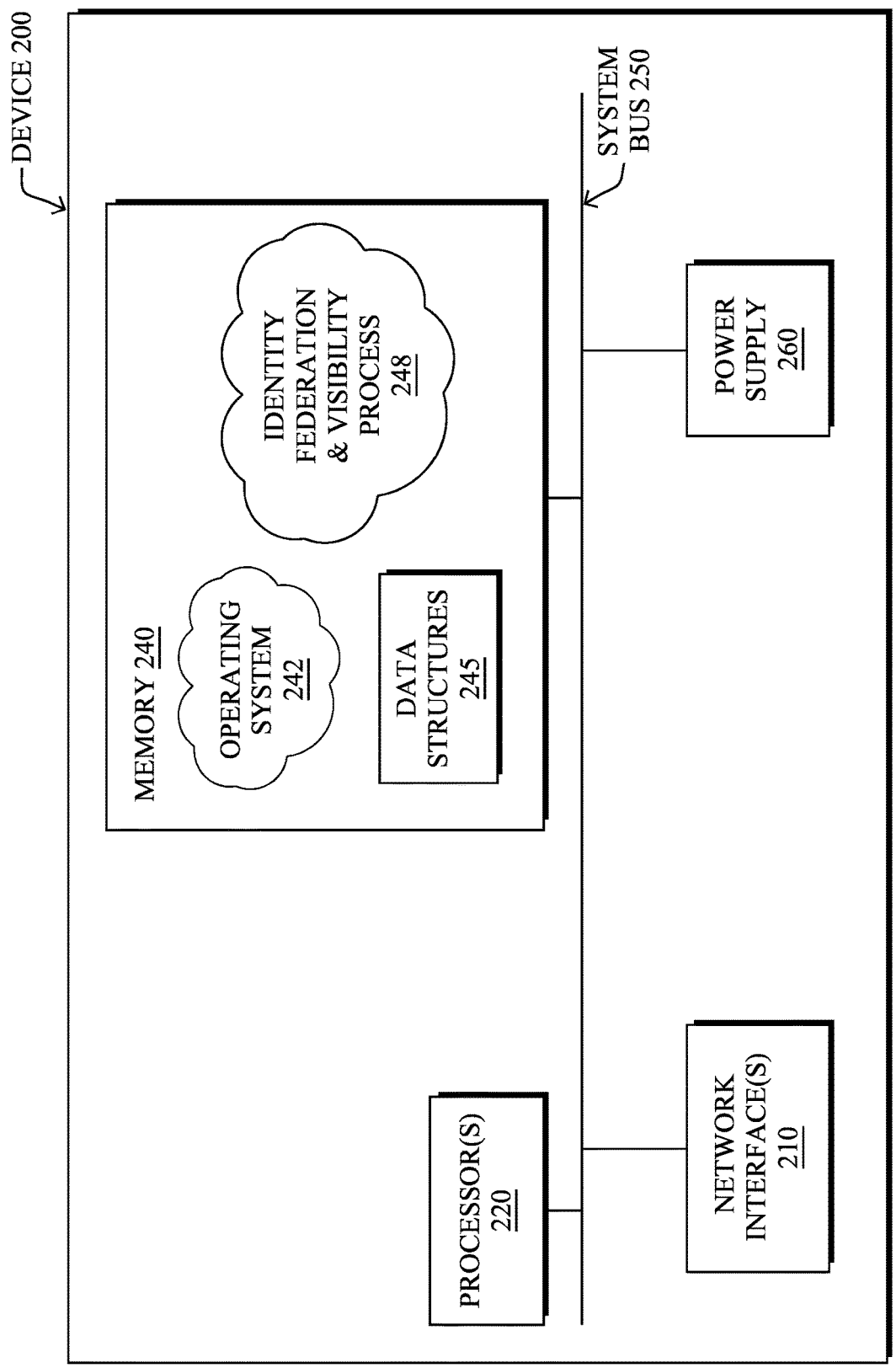
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise an identity federation and visibility process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, visibility represents one of the main areas of focus in supply chains, as they undergo a digital transformation. In general, visibility refers to the ability to answer questions such as the following:

What is this item?
Where is a particular item?
What is the state of a particular item?
Etc.

Without visibility across the supply chain, it is quite difficult to make informed decisions. Despite this, modern supply chains tend to be fractured in terms of visibility, due to the myriad of organizations that may be involved.

A major challenge in automating end-to-end supply chains is that there is no one-size-fits-all identification technology that has received universal support by the industry. Today, for instance, some products may be tagged with radio frequency identification (RFID) transponders, others may use barcodes. Bluetooth Low Energy (BLE) or alternative technologies in the future, such as ultra-wideband (UWB) or cellular (e.g., 5G) active tags. These technologies have different identity spaces and formats, and many tagged products have different identity providers. For example, the identity of a product while under the responsibility of a first carrier is very likely to be different than the identity of the same product while under the responsibility of a second carrier. In fact, it is quite common for a product to be "re-tagged" when passing from one carrier to another, effectively changing its digital identity.

Even if all the supply chains worldwide would agree upon a single Universally Unique Identifier (UUID) and a common traceability technology, still dealing with different identity providers is unavoidable by the mere construction of the supply chain. For instance, many warehouses receive, store, and ship products manufactured by different entities, and therefore, those products will have different identity providers. In fact, supply chains are inherently federated ecosystems, but their members lack the ability to amalgamate the different identities and identity providers involved in this type of federation.

Accordingly, there is a real-world demand to verify, and attest to, the identity of items that are transported via a (contactless) supply chain across different organizations. One potential approach to achieving this would be to build complex integrations between the systems of two organizations (e.g., a shipper and a carrier). However, this typically is requires both organizations to use the same software or for one organization to 'adapt' to the system of another organization. Adaptation of a common system is typically not practical, when across an entire supply chain, as there may be many different organizations that have responsibility for an item.

Item Identity Federation and Visibility as a Service

The techniques herein introduce an item identity federation and visibility service that allows common policy lists to be rendered, automatically, for exchanging data between organizations based on their profiles (e.g., a manufacturer and a warehouse, a transporter and a warehouse, etc.). In some aspects, the techniques herein also allow users to select which information they wish to request from other organizations (e.g., a 'visibility intent'), as well as the information they would like to publish to other organizations (e.g., a 'visibility offering'). In further aspects, the techniques herein allow for the automatic matching of visibility policies among organizations: 1.) based on the identification technologies used (e.g., RFID, barcodes, BLE, etc.) and 2.) based on the specified visibility intents and the visibility offerings.

Illustratively, the techniques described herein may be performed by hardware, software, and/or firmware, such as in accordance with the identity federation and visibility process 248, which may include computer executable instructions executed by the processor 220 (or independent processor of interfaces 210) to perform functions relating to the techniques described herein.

Specifically, according to various embodiments, a service deploys a first service connector to a first deployment network of a first organization and a second service connector to a second deployment network of a second organization. The service receives a selected visibility offering by the first organization and a selected visibility intent for the second organization. The service determines a data sharing policy by matching the selected visibility offering by the first organization to the selected visibility intent for the second organization. The service configures the first service connector to capture data specified by the data sharing policy from the first deployment network and provide that data to the second service connector.

Operationally, the federated identity method introduced herein allow for information about an item to be shared across different organizations, systems, and/or technologies. In such a model, instead of a single identity system being used, requests for verification and/or validation of an identity may be passed to a specified identity provider. Note that prior approaches to this have mainly focused on the authentication and authorization of users or other data consumers. However, the requirements in terms of item identification in a contactless supply chain differ significantly from what these types of approaches offer. For instance, inventory visibility typically entails challenges relating to identification and notification across domains, rather than those relating to authentication or guest network access. Indeed, an RFID interrogator or barcode scanner will not need remote authentication of a passive RFID transponder or barcode, since such a functional requirement does not (currently) exist. Moreover, many of the devices used to tag (and identify) inventory do not need guest/Internet access (e.g., RFID, BLE, barcodes, UWB, etc.).

In addition, simplicity and ease of use is paramount in supply chains. Indeed, the trend in this sector is to increase the level of automation of the large majority of the processes. In so doing, organizations are choosing to lease a significant part of the equipment and infrastructure needed to run the business, rather than purchase such systems themselves. This applies to a wide variety of equipment, ranging from advanced systems such as Automated Mobile Robots (AMRs) and automated forklifts to industrial RFID interrogators, meaning that there is a rapidly increasing number of third-party identities and devices that need to interact with the local communications infrastructures and systems of an organization.

Figure 3:
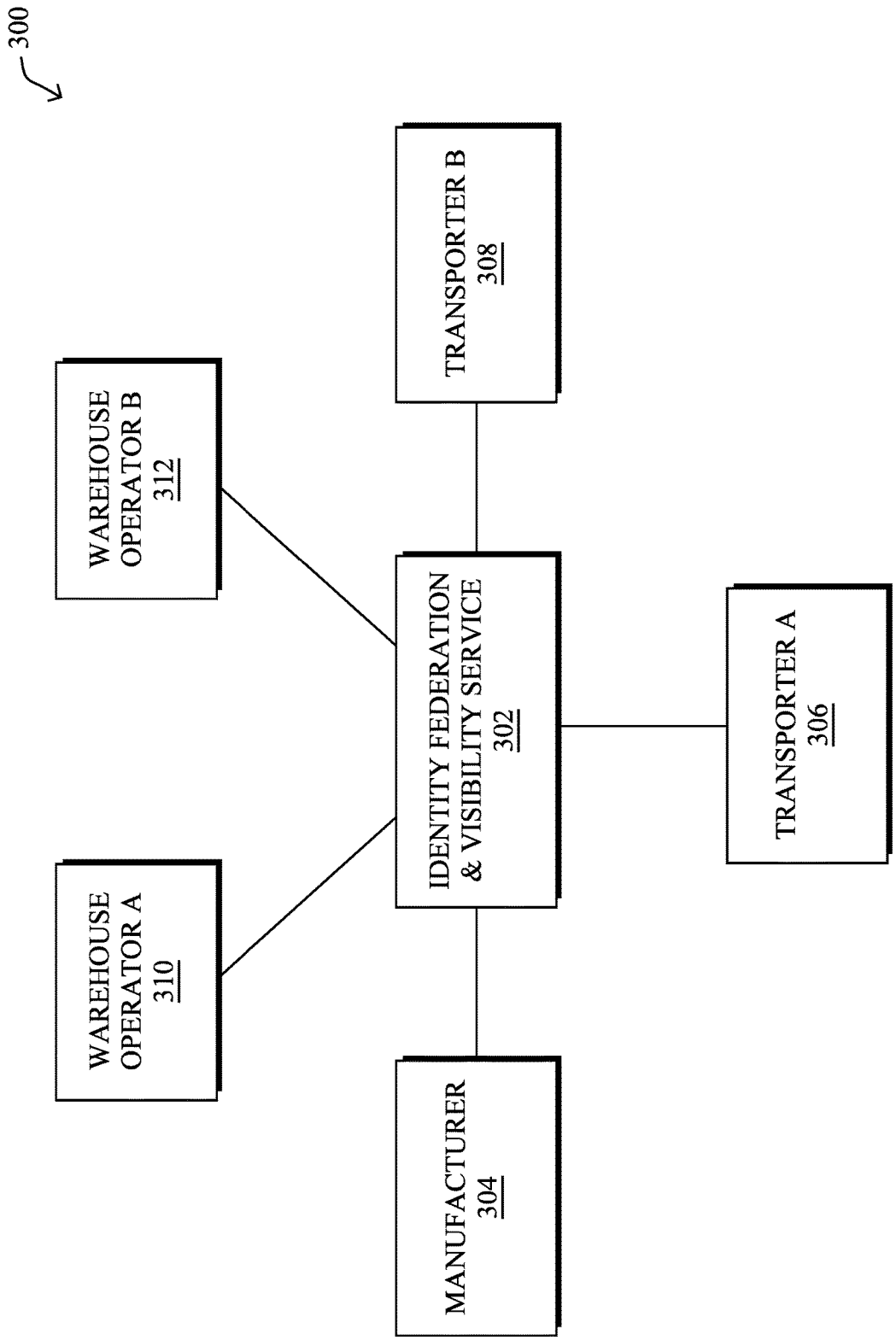
FIG. 3 illustrates an example identity federation and visibility service.

FIG. 3 illustrates an example identity federation and visibility service, according to various embodiments. As shown, system 300 may include an identity federation & visibility service 302 that allows any organization (e.g., a member of a supply chain) to easily initiate an identity federation. For instance, as shown, consider a typical supply chain that involves the following organizations: a manufacturer 304 that ships an item to a destination. During transit, any number of transporters, such as transporters 306-308 (e.g., a first transporter, a second transporter, etc.), may receive, transport, and hand off the item to another organization. In addition, there may be any number of other organizations involved in the supply chain, such as warehouse operators 310-312 (e.g., a first warehouse operator, a second warehouse operator, etc.), that store the shipped item while in transit and/or on delivery.

By way of example, consider the case in which manufacturer 304 is to send an item for delivery to a third-party warehouse operator 312 (e.g., a retailer). To do so, manufacturer 304 may pass the item to transporter 306. In turn, transporter 306 may ship the item and, at some point, deposit the item at a warehouse operated by warehouse operator 310. From there, transporter 308 may pick up the item from the first warehouse and convey it through its own channels until finally delivering the item to its final destination, a warehouse operated by warehouse operator 312.

At the core of system 300 is identity federation & visibility service 302, which may be provided by one or more devices, such as device 200, through the execution of identity federation and visibility process 248. In some instances, identity federation & visibility service 302 may be provided by an organization that differs from those of manufacturer 304, transporters 306-308, warehouse operators 310-312. In other instances, identity federation & visibility service 302 may be provided by any of these organizations.

After creating an identity federation via identity federation & visibility service 302, the creator can invite other organizations to join the federation and start using it. More specifically, the techniques herein allow even non-technically savvy users to create and/or join an identity federation via identity federation & visibility service 302 in a rapid manner. Once established, the identity federation provided by identity federation & visibility service 302 allows the authorized participant organizations to share and view information about the item throughout its traversal of the supply chain.

For instance, assume that each of the organizations 304-312 have registered with identity federation & visibility service 302 and participate in the identity federation of the item shipped by manufacturer 304. Each of these organizations may independently specify their intents in terms of what data they wish to receive regarding the item, as well as in terms of what data they are willing to share. Assume, for instance, that manufacturer 304 wishes to know the state of its item in terms of where it is, when it arrived at its current location, when it leaves, the level of inventory in its final destination, etc. Through the use of identity federation & visibility service 302, the other organizations 306-312 may provide updated information to identity federation & visibility service 302 regarding the item, automatically, allowing manufacturer 304 to access this information via identity federation & visibility service 302.

Figure 4:
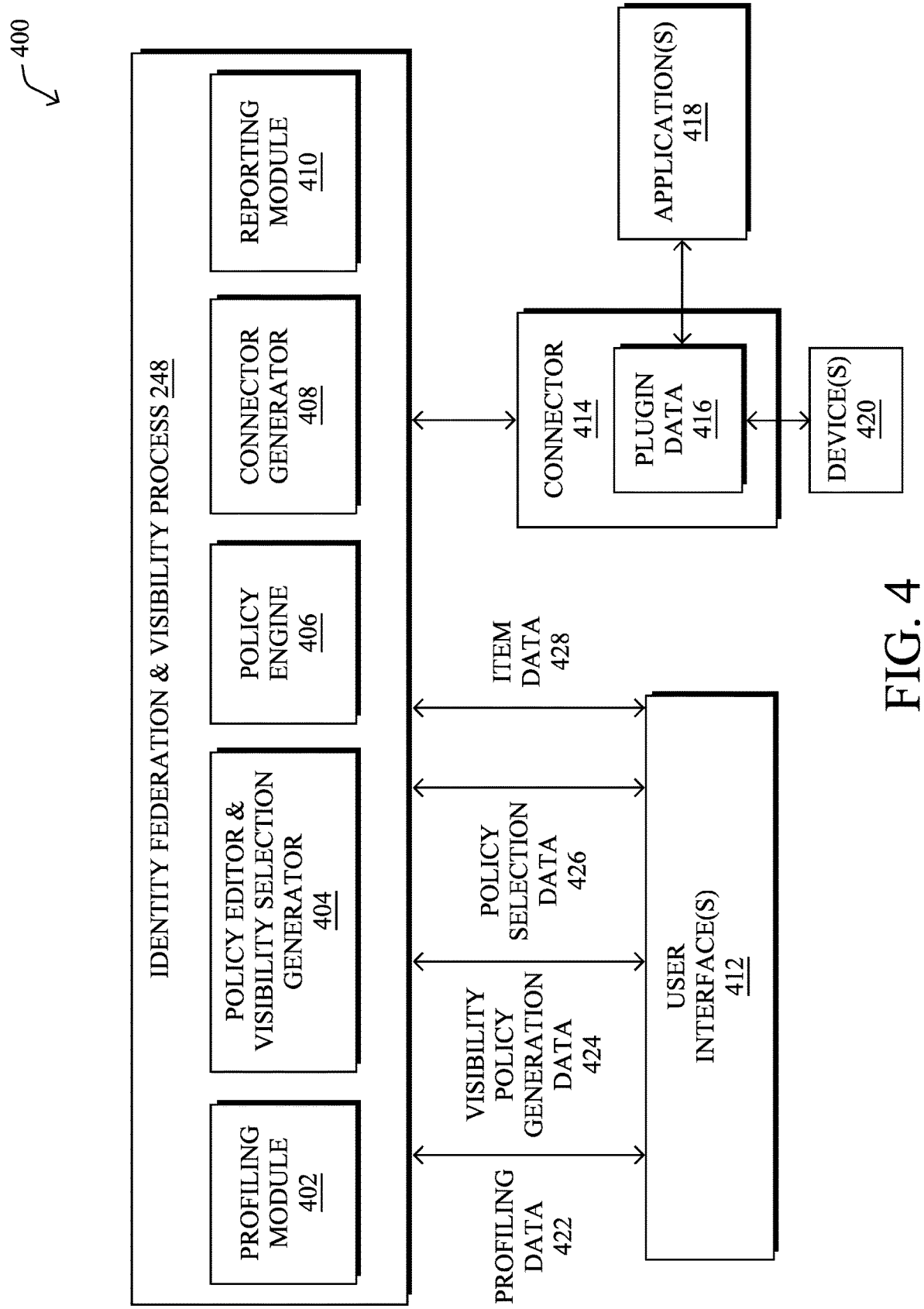
FIG. 4 illustrates an example architecture for an identity federation and visibility service.

FIG. 4 illustrates an example architecture 400 for an identity federation and visibility service, such as identity federation & visibility service 302 in FIG. 3. At the core of architecture 400 is identity federation and visibility process 248 which may comprise any or all of the following components: a profiling module 402, a policy editor & visibility selection generator 404, a policy engine 406, a connector generator 408, and/or a reporting module 410. As would be appreciated, the functionalities of these components may be combined or omitted, as desired. In addition, these components may be implemented on a singular device or in a distributed manner, in which case the combination of executing devices can be viewed as their own singular device for purposes of executing identity federation & visibility process 248.

During execution, identity federation & visibility process 248 may communicate with any number of user interface(s) 412 operated by any number of people across any number of organizations. For instance, user interface(s) 412 may comprise desktop computers, laptop computers, smart phones, tablet devices, wearable electronic devices, or the like.

According to various embodiments, a domain expert for an organization may use user interface(s) 412 to specify profiling data 422 to identity federation & visibility process 248. In turn, profiling module 402 may use profiling data 422 to define a set of selectable visibility policies for the organization or a domain of the organization. In other words, profiling module 402 may generate and expose a set of pre-defined visibility offerings and intents that could be applied and/or modified later on by a particular organization. For instance, profiling data 422 may define different organization types, such as, but not limited to, manufacturers, warehouse operators, transporters, etc., in the case of a supply chain. In other embodiments, identity federation & visibility process may be used to set up a federation in other use cases, as well, such as healthcare, insurance, or the like. As would be appreciated, the domain expert(s) may be unaffiliated with the specific organization participating in an identity federation and may simply provide a base set of defaults for process 248 for the usage domain (e.g., supply chain, healthcare, etc.).

The domain expert(s) may also provide visibility policy generation data 424 that allows policy editor & visibility selection generator 404 to automatically generate predefined policy templates. In general, visibility policy generation data 424 indicates the types of data that an organization with a particular profile may be able to share and/or the types of data that it may wish to be able to access. For instance, a policy template for a particular type of organization, as indicated by its profile, may specify a predefined set of preferences for its visibility intent and visibility offerings. In addition, the choices available for selection in the template may also depend on the organization type of the participant and/or those with whom the organization is to interact as part of the supply chain. For instance, a Manufacturer profile may be associated to a Manufacturer policy template, while a Warehouse might be associated to a Warehouse policy template. Based on these two policy templates and considering the (Manufacturer, Warehouse) pair, policy editor & visibility selection generator 404 may auto-render a predefined set of choices that each member of the pair can select to express its visibility intent and offerings. Likewise, policy editor & visibility selection generator 404 may auto-render a predefined set of choices for a (Transporter, Warehouse) pair or a (Manufacturer, Transporter) pair. The list of auto-rendered policies may vary depending on the members profiles. For example, the visibility choices auto-rendered by policy editor & visibility selection generator 404 for (Manufacturer_1, Warehouse_1) and (Manufacturer_2, Warehouse_2) would be the same, while the one for (Transporter_1, Warehouse_1) might differ.

Thus, as a result of the processing by profiling module 402 and policy editor & selection generator 404, identity federation & visibility process 248 now has a set of default visibility policies that indicate the set of 'intents' of the organization or domain in terms of which data that it is able to share (e.g., its 'visibility offerings'), as well as any information that it can access from another organization (e.g., its 'visibility intent').

Once the above initializations have occurred, specific organizations and their users may be onboarded by process 248. Such a registration may, for instance, associate a particular organization with a profile type and, accordingly, a set of default policy templates for them. For instance, a particular user at Warehouse A may provide details to process 248 regarding their organization (e.g., location information, contact information, etc.). In addition, this information may also indicate the specifics of the capabilities of the systems of the organization, such as its software systems, identification technologies in use, and/or any other information that may be captured regarding the participating organization. For instance, this information may indicate, for a particular organization or domain, which identification technologies are in use by that organization, such as RFID tags, barcodes, Wi-Fi, cellular, BLE tags, UWB, and the like.

In various embodiments, a user associated with a particular organization registered with process 248 may specify policy selection data 426, which is used by connector generator 408 to construct and deploy the appropriate connector(s) 414, to facilitate the corresponding sharing of data across organizations. Typically, policy selection data 426 comprises a selection of the visibility intent and/or visibility offering of that user. For instance, policy selection data 426 may take the form of checkbox input that allows a user to select from among the template policy options generated previously by policy editor & visibility selection generator 404 and based on the specific profiles of the organizations involved.

FIGS. 5A-5B illustrate examples of visibility selection, according to various embodiments. As shown in FIG. 5A, the identity federation & visibility service may provide display data 502 to a user interface associated with a 3$^{rd}$ party warehouse (e.g., Warehouse W), thereby allowing a user of that organization to specify policy selection data 426 for a Manufacturer M (e.g., manufacturer 304). For instance, display data 502 may take the form of a checklist via which the user is able to specify the policy target(s) 504, send policy data 506 regarding what types of information should be sent, as well as the corresponding receive policy data 508. Similarly, display data 512 shown in FIG. 5B may be sent to a user interface associated with Manufacturer M, also a participant in the identity federation, that allows that organization to specify its own policy target(s) 514, send policy data 516, and receive policy data 518, with respect to Warehouse W.

As would be appreciated, the options available to a user may vary depending on the organization type, the peer's organization type, identification technology, etc., and selectable pairs may be auto-rendered based on profile pairs (e.g., a manufacturer-warehouse pair, a warehouse-carrier pair, etc.). For instance, a warehouse operator may specify any or all of the following as part of a send policy: notify arrival, notify departure, in stock query, quantity in stock query and specify any or all of the following as part of a receive policy: estimated time of departure (ETD) updates, asset description, or asset state. In contrast, a manufacturer may be able to specify any or all of the following as part of a send policy: ETD updates, asset description, or asset state. In addition, the manufacturer may specify any or all of the following as part of a receive policy: notify arrival, notify departure, in stock query, quantity in stock query. Another example selection may indicate the location of a particular item (e.g., in terms of coordinates), which may be of interest with respect to a transporter.

Referring again to FIG. 4, assume that process 248 receives the selections from FIGS. 5A-5B as policy selection data 426. In such a case, policy engine 406 may perform either or both of the following levels of policy matching:
1. [identification technologies @Manufacturer M]←match→[identification technologies @Warehouse W1].
   For instance, if Manufacturer M uses RFID and Warehouse W1 uses RFID, barcodes and BLE, then data exchanges between Manufacturer M and Warehouse W1 shall only cover the technology they have in common, namely, RFID. This is because if Manufacturer M sends items tagged with RFID identifiers to Warehouse W1, the identification of such items can only be done by RFID readers/interrogators within Warehouse W1.
2. [visibility intent @Manufacturer M] (e.g., receive policy data 518)←match→[visibility offering @Warehouse W1] (e.g., send policy data 506) && [visibility offering @Manufacturer M] (e.g., send policy data 516)←match→[visibility intent" @Warehouse W1] (e.g., receive policy data 508).

Once each participant makes its preference selections, policy engine 406 may generate corresponding policies, based on any matches. Note that the policy preference selections may be decoupled in time and location, meaning that the auto-rendering of common policies available for federation participants may be symmetric. This would allow policy engine 406 to automatically match the intents expressed by the participants and build a visibility policy constraining the data exchanges among parties based on those matches.

According to various embodiments, policy engine 406 may match visibility intents and visibility offerings specified via policy selection data 426 across any number of organizations or domains. For instance, one organization may wish to receive a notification when another organization receives any of its shipped goods. If the second organization specifies a visibility offering that matches the visibility intent of the first organization, policy engine 406 may implement the corresponding data sharing policy between the two organizations. In other words, the role of policy engine 406 may be to: 1.) hook, map, and manage the send and receive policies produced by policy editor & visibility selection generator 404, 2.) perform matching among those send and receive policies selected via policy selection data 426, and/or 3.) distribute the policies to the identity federation core and to the applicable connectors, such as connector 414, as detailed below.

As would be appreciated, the set of available options for an organization, as well as its selected visibility offerings and intents, can change over time. Indeed, even though a default set of selectable options may be configured for an organization, these options can be modified over time, as needed, in some embodiments. For instance, say an organization outfits its warehouse with BLE scanners. In such a case, a person associated with that organization may specify this new offering as an option to identity federation & visibility process 248. In turn, the new options will be auto-rendered and made available to the users of the federation. Similarly, a user may adjust their policy selection data 426 over time, such as when additional information is desired, certain information is no longer of interest, etc. Indeed, even though process 248 may present users with default options to set visibility policies, these options could be modified over time by an authorized user, in some embodiments.

Identity federation & visibility process 248 may also maintain any number of identity federations across open, semi-private, or private consortia of the various organizations. In addition, members may be part of multiple identity federations maintained by identity federation & visibility process 248, simultaneously.

In some embodiments, an identity federation may be implemented as an unmanaged service, through the execution of identity federation & visibility process 248, with no requirement for an identity federation provider to operate the federation. This allows the federation to begin functioning as soon as a first organization establishes it and invites a second organization to participate in the federation and start exchanging data.

In the case in which a user opts to start a new identity federation, the user may specify this to process 248, such as the name of the new identity federation, invitees to the federation, and the like. In one embodiment, identity federation & visibility process may also suggest invitees to the user via user interface 412 and/or allow the user to pick invitees from a predefined list. This may be based, for instance, on the prior selections of the user and/or organization for other identity federations, the most common invitees (e.g., particular transporters, etc.), a template defined by the user, or the like.

As would be appreciated, not all of the invitees specified by a user may be registered with identity federation & visibility process 248. In such cases, the user setting up a new federation may also specify information such as any or all of the following:

1. The name of the invitee (e.g., 'Warehouse W1').
2. An email address or other contact information to which identity federation & visibility process 248 may send an invitation for the identity federation.
3. A member role that indicates the allowed activities for the invitee within the federation (e.g., "member," "co-owner," "member with the right to invite others," etc.).
4. Membership duration information (e.g., one day, one week, permanent, etc.).
5. Other information regarding the invitee (e.g., the location of the invitee, notes, etc.).

Note that, in some instances, the creator of an identity federation via identity federation & visibility process 248 may also delegate the ability to invite others to one or more invitees. This is an important capability, as many logistics and transportation companies rely on several layers of subcontracting in order to deliver an outcome. By extending invitations to subcontractors so that they can participate in the identity federation and exchange information about an item, visibility of the item can be greatly improved. Once the process is complete, identity federation & visibility process 248 may send invitations to the selected invitees (e.g., by sending links to identity federation & visibility process 248 by email, text message, etc.).

In general, an invitation to join an identity federation may identify the federation to the invitee and may include security token information that identifies the invitee to identity federation & visibility process 248. Once registered with identity federation & visibility process 248, or logged into an existing account, the invitee may enroll with the created identity federation. During this step, each party may select whether its profile should be public or not (e.g., whether the company/entity name should be publicly available and listed). An organization may also maintain different accounts and/or user roles, such as when the organization participates in different identity federations. For instance, a member may create internal tenant accounts, such as a 'viewer' account, an 'admin' account, etc.

According to various embodiments, connector generator 408 of identity federation & visibility process 248 may be configured to generate any number of 'connectors' for the participants in a federation, based on matches between their visibility offerings and visibility intents. For instance, connector generator 408 may generate connector 414 that encompasses the software necessary to interface with the item identification technologies used by a particular organization/participant in an identity federation.

As would be appreciated, item information may depend heavily on the internal systems of the source organization. For instance, different organizations may maintain item information in various enterprise-level applications or systems, such as an Enterprise Resource Planning (ERP) system, a Warehouse Management System (WMS), a Warehouse Execution System (WES), a Transport Management System (TMS), or the like. To this end, connector generator 408 may be configured to select plugin data 416 for inclusion in a connector (e.g., connector 414) that facilitates the sharing of information from that resource. For instance, assume that an organization uses one or more application(s) 418 to maintain item information, such as a TMS. In such a case, plugin data 416 may include the information needed to interface with the TMS of the organization (e.g., credential information, etc.), to obtain or update information about an item in transport by the organization. Similarly, a connector 414 may be configured to share data from particular device(s) 420, such as an RFID reader, etc., via the federation.

Typically, the communications enabled by plugin data 416 may be limited to accessing only the information needed to support the visibility intents and visibility offerings associated with the various participants, as determined and enforced by policy engine 406. For example, assume that Warehouse W1 receives a pallet of RFID-tagged items from Manufacturer M. As soon as an RFID reader of Warehouse W1 scan the items, the corresponding information may be captured into the application(s) 418 of Warehouse W1 and captured by way of plugin data 416, which may comprise one or more plugins for those application(s) 418. In reading the information encoded on the RFID tag, the system is able to determine the identity provider as being Manufacturer M. This then determines that the information should be 'routed' according to the policy associated with Manufacturer M. Note that this data flow may occur because Manufacturer M specified a visibility intent of "notify arrival" that matched a visibility offering selected by Warehouse W1.

In further embodiments, connector 414 may include plugin data 416 configured to interface with the device(s) 420 of the organization, directly. For example, connector 414 may receive data in parallel from any number of deployed RFID scanners in addition to, or in lieu of, interfacing with a WMS or other application 418 of that organization. For instance, connector 414 may obtain scan information directly from a scanner, but may obtain inventory count information from a WMS or other application 418.

According to various embodiments, connector generator 408 may construct a connector 414 based on the profile of the organization, its identification technologies, and/or its corresponding plugins. In general, connector 414 functions as an entity that allows an organization to connect to identity federation & visibility process 248 and exchange data flows. For security reasons, connector 414 may also include a certificate signed by connector generator 408, to certify its identity to the identity federation & visibility process 248. Likewise, the identity federation & visibility process 248 may also handle a certificate to certify its identity to the organization's connector 414.

Assume, for instance, that a participant in an identity federation has specified the following: Profile="Warehouse"; Technologies="(RFID, Barcodes)"; Plugin="Oracle's WMS version X"; CERT="W_autosigned". In this example, connector 414 may take the form of a software element (e.g., an image), which, once instantiated, embeds the processes providing the following functionality:
- A list of policies that the participant can select to define its visibility intent, based on its profile, which may be modifiable on a per-participant basis.
- A list of policies that the participant can select to define its visibility offering, based on its profile, which may also be modifiable on a per-participant basis.
- The ability to parse and forward Electronic Product Codes (EPCs) from application(s) 418 and/or device 420, which is the standardized identity format used both by RFID tags and Barcodes.
- Plugin data 416 to parse and forward a set of messages to/from Oracle's WMS (e.g., an application 418).
- Code to create secure communications with identity federation & visibility process 248 that are authenticated using the certificate information provided by connector generator 408.

In some embodiments, a new connector 414 may be instantiated for each identity federation in which an organization participates. In another embodiment, a single connector 414 may include the ability to slice and isolate item data from different identity federations, as in the case in which the organization is participating in multiple identity federations. In further embodiments, connector 414 may also be configured to store and cache policies (e.g., by implementing a localized form of policy engine 406).

Once connector generator 408 has generated a connector 414, identity federation & visibility process 248 may deploy it to its target organization either on a push basis or on a pull basis (e.g., in response to the organization requesting a download of connector 414). As noted, the specific configuration of connector 414 may depend on the identification technologies and/or plugins specified by the target organization. For instance, if RFID and barcodes were chosen, connector 414 may be configured as yet another data consumer in the existing data capture workflows of the organization, as well as interface with internal application(s) 418. In a further enhancement, connector 414 may also interface directly with the endpoint devices and/or networking equipment responsible for capturing and reporting the item data. For instance, connector 414 may be configured to interface with BLE beacons, UWB anchors, Layer 2 switches, wireless access points, wireless access point controllers, or the like. To support this, connector generator 408 may include the corresponding plugin data 416 into connector 414, such as the plugin data needed to interface with application programming interfaces (APIs) of a is network switch, barcode reader, etc.

Once connector 414 has been deployed, it may automatically and securely connect to identity federation & visibility process 248 (e.g., the service) and/or directly with other connectors of other participating organizations in the federation. This may be achieved by establishing a mutual transport layer security (mTLS) tunnel, for instance. Thus, as shown previously in FIG. 3, identity federation and visibility service 302 may communicate with organizations 304-312 via secure tunnels that are established with corresponding connectors 414 deployed to those organizations. In turn, the connectors may report the required item data to service 302, as needed.

Policy engine 406 is also responsible for enforcing the visibility policies generated by policy editor & visibility selection generator 404. As would be appreciated, the visibility policies between organizations may differ. Indeed, the policies for exchanging data between a transporter and a warehouse operator may differ from the policies for exchanging data between a manufacturer and a warehouse operator. Thus, a warehouse operator may share certain information with a carrier that the shipper (e.g., the manufacturer) may not be allowed to view.

Policy enforcement by policy engine 406 can be achieved by placing restrictions on reporting module 410, which is responsible for reporting any item data collected by a connector 414 to any of the other participants of the federation that match that data. In turn, reporting module 410 may provide that collected item data as item data 428 to the authorized organizations via user interface(s) 412. Note that the functionalities of reporting module 410 may also be implemented as part of connector 414, thereby allowing connector 414 to report item data 428 to one or more other connectors, directly, for presentation to a user interface 412. In various embodiments, item data 428 may be sent via the corresponding connector(s) 414 deployed to the destination organization(s) authorized to receive the item data. This allows, in some instances, item data 428 to be fed into the system(s) of that organization via the plugin data of the connector. For instance, in some cases, item data 428 may automatically populate the ERP system of the organization receiving item data 428.

By way of illustration of the operation of the full system, consider again the case shown in FIG. 3. Assume that manufacturer 304 ships an item with a passive RFID tag to warehouse operator 310. An RFID reader in the warehouse may read the data in the RFID tag, providing local visibility to the systems of warehouse operator 310 (e.g., a WMS application, etc.). The item data read by the RFID interrogator thus reaches the connector deployed to warehouse operator 310, allowing the connector to either find a matching entry or filter the data. Various embodiments could be used to enable such functionality at the connector level. For example, connectors might cache the ID of the owners (or identity providers) along with the corresponding visibility policy. Another option could be to push policy and updates to the connectors. The connectors might also be stateless and might not be endowed with any caching mechanism, in which case, the messages will always hit the federation.

Now, if the "Notify Arrival" preference was selected by both parties, as shown in FIGS. 5A-5B, the item data may be extracted from the passive RFID tag and parsed by the connector deployed to warehouse operator 310. In turn, that connector may send the item data from the RFID reader to manufacturer 304, thereby allowing a user of manufacturer 304 to view that the item shipped by manufacturer 304 was received by warehouse operator 310. Similar data flows may be set up on a per-technology basis, such as for barcodes, BLE, UWB, etc.

In more complex examples, visibility policies may allow for different levels of aggregation, such as by aggregating groups of item identifiers. For instance, a 'notify arrival' policy may be applied to an entire pallet of items, rather than for each of the individual items on the pallet.

In some embodiments, the identity federation may be used for exchanging both identity-related data, as well as context and state-related data, subject to the visibility policies described above. In other words, identity federation & visibility service 302 may serve as both the control plane and data plane, to enable the desired levels of visibility among parties in the supply chain. In other embodiments, the identity federation may only carry control plane data and may provide trusted pointers (e.g., endpoint addresses), so that the parties can exchange context and state-related data directly among themselves. In a further enhancement, the identity federation may support a hybrid model, providing both control and data plane functions for certain types of identities, profile members or visibility functions, while providing control and data plane separation for others.

In further enhancements, the identity federation may support any or all of the following:
 more flexible profiles and templates, such as customizable templates;
 programmable/extensible policies;
 programmable/extensible plugins;
 more flexible certificate and handling or even a full-fledged public key infrastructure (PKI);
 additional decoupling between the identifying/routing functions and the exchange of context and state-related data.

According to various embodiments, the federation techniques herein can also be extended to exchange information regarding connected assets and/or the workforce of the organizations. For instance, assume that warehouse operator 310 has deployed a number of AMRs or automated forklifts in its warehouse. In such cases, the connector deployed to warehouse operator 310 may also interface with their corresponding systems, to provide the manufacturer of those devices (and any other authorized participant of the federation) information regarding these devices. Similarly, personnel information could also be captured and sent, through the use of the appropriate connector and plugins. For instance, warehouse operator 310 may send to transporter 308 information regarding the precise location of the item, identification of the robot or person transporting the item within the warehouse, and an expected time that the item will be ready for pickup by transporter 308.

Warehouse operators are increasingly leasing high-value equipment, such as AMRs and the like. Since such systems require data network communication in order to operate, AMRs or unmanned forklifts represent third-party devices that require trusted access to the warehouse network. Thus, identity federation & visibility service 302 may be used to dynamically identify these assets and enable trustworthy communications between these assets and the management systems of their corresponding service providers, which may be integrated into the federation as additional participants.

For instance, warehouse operator 310 may exchange data gathered through a Wi-Fi technology connector with remote Forklift or Robotics Management systems running in a remote location, such as a cloud-hosted compute facility. However, it may exchange data gathered only through the RFID connector with other parties upstream in the supply chain, including the manufacturer/seller of the items tagged with RFID.

Figure 6:
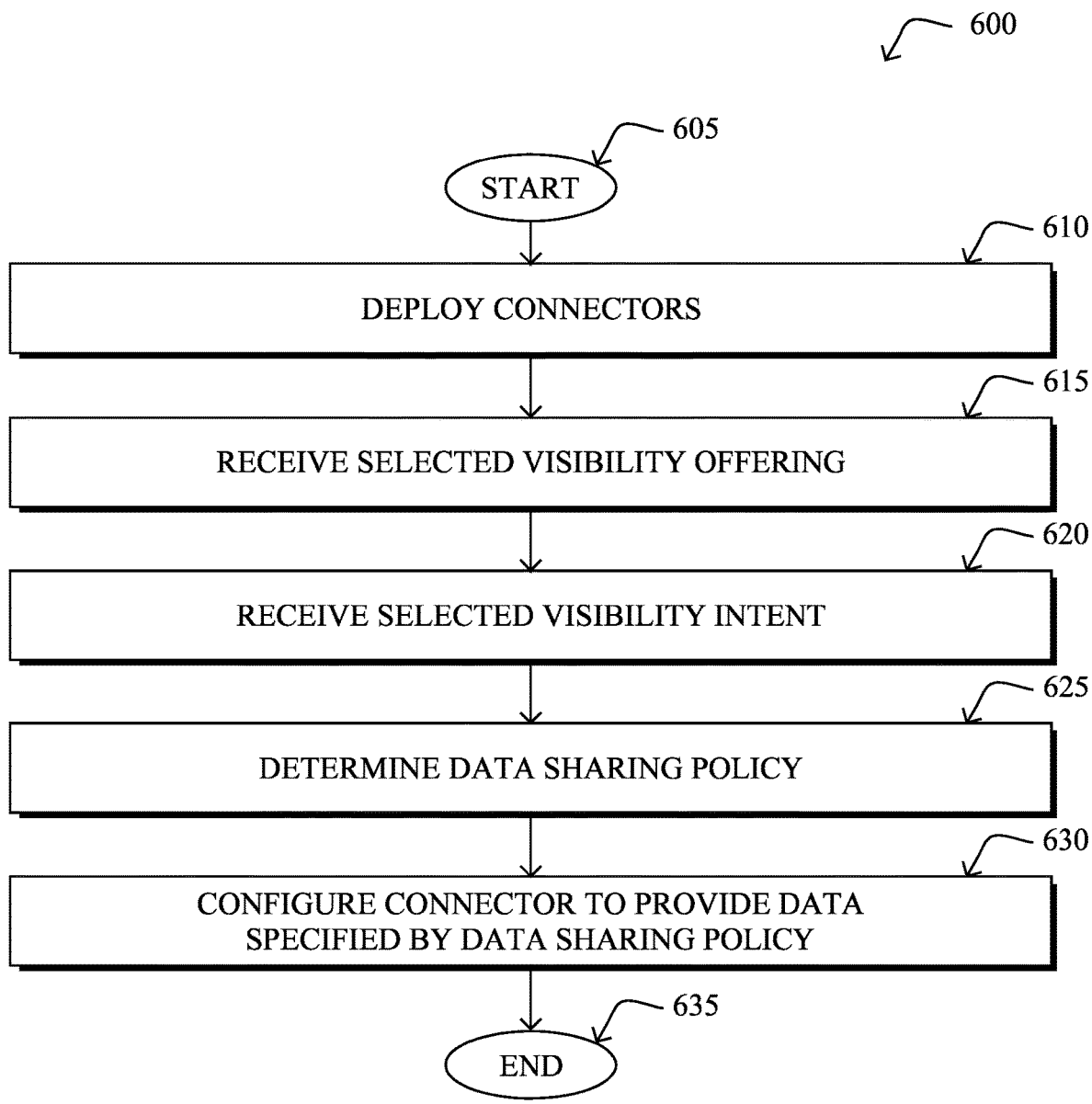
FIG. 6 illustrates an example simplified procedure for providing item identity federation and visibility as a service.

FIG. 6 illustrates an example simplified procedure for providing item identity federation and visibility as a service, in accordance with one or more embodiments described herein. In various embodiments, a non-generic, specifically configured device (e.g., device 200) may perform procedure 600 by executing stored instructions (e.g., process 248), to provide an identity federation and visibility service to any number of organizations. The procedure 600 may start at step 605, and continues to step 610, where, as described in greater detail above, the service may deploy a first service connector to a first deployment network of a first organization and a second service connector to a second deployment network of a second organization. For instance, a particular service connector may be configured to capture data via a plugin associated with one of: an enterprise resource planning (ERP) system, a warehouse management system (WMS), a warehouse execution system (WES), or a transport management system (TMS). In further embodiments, a particular service connector may be configured to capture data via a plugin associated with at least one of: a barcode scanner, a radio frequency identification (RFID) tag scanner, a Bluetooth Low Energy (BLE) tag scanner, or an ultra-wideband (UWB) tag scanner.

At step 615, as detailed above, the service may receive, a selected visibility offering by the first organization. For instance, the service may send a set of different types of data that the first service connector can provide to a user interface. In response, the service may receive from the user interface a selection of a subset of the set of different types of data that the first service connector can provide. In some embodiments, the service may also select the set of different types of data that the first service connector can provide based on a profile associated with the first organization and on a profile associated with the second organization. In doing so, the service may offer different options to the user interface for the visibility offering, depending on the identities of the two organizations. For instance, the user may be able to select different types of data if the two organizations comprise a (Manufacturer, Warehouse) pair than if the two organizations comprise a (Transporter, Warehouse) pair.

At step 620, the service may receive a selected visibility intent for the second organization, as described in greater detail above. Similar to the visibility offering by the first organization, the visibility intent may comprise a selection of types of data that the second organization would like to receive from the first organization. In some embodiments, the visibility intent may be selected from a set of data types that depends on the identities of the two organizations.

At step 625, as detailed above, the service may determine a data sharing policy by matching the selected visibility offering by the first organization to the selected visibility intent for the second organization. For instance, assume that the visibility offering indicates an event such as an arrival scan or a departure scan, an inventory count, or the like. If the visibility intent also specifies the same event, the same inventory count, etc., the service may determine that the first service connector is authorized to provide that event, inventory count, etc. to the second service connector. As would be appreciated, while a simple federation may comprise only two organizations, further embodiments allow for data to be shared by one organization with any number of other organizations (e.g., a third organization, etc.), in the same way.

At step 630, the service may configure the first service connector to capture data specified by the data sharing policy from the first deployment network and provide that data to the second service connector. Thus, the first service connector may relay scan data from a tag scanner, application, or other device of the first organization to the second service connector of the second organization. In doing so, the second organization will gain visibility into the operations taking place at the first organization. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the unified identity and visibility of items across a supply chain. One of the main advantages of the techniques herein is that it requires neither a central identity federation provider, nor waiting for a network effect. Indeed, just two parties/organizations can create a federation and start benefiting from its use, immediately. In further aspects, the techniques herein could be adapted for use across any number of use cases (e.g., hospitals, public sector, defense, etc.). In addition, the techniques herein provide improved visibility of assets and inventory across multi-organization supply chains in a controlled way, such as by enabling policy-driven data exchange between supply chain members using trusted digital identities and enabling private identity federations between supply chain members. The techniques herein also reduce the amount of time needed to add new organizations to a supply chain by enabling the rapid establishment of trusted relationships between supply chain members and their systems. This helps to reduce the time needed to onboard new devices to a supply chain and allows for the automatic matching of data providers and consumers through trusted data channels, in real-time.

While there have been shown and described illustrative embodiments for identity federation and visibility as a service, it is to be understood that various other adaptations and modifications may be made within the intent and scope of the embodiments herein. For example, while specific types of identification technologies are described herein (e.g., RFID, BLE, etc.), the techniques herein are not limited as such and can be applied to any form of identification technology. Further, while the techniques herein are described primarily with respect to federating item identities and providing item visibility across a supply chain, the techniques herein are not limited as such and can also be extended to federating workforce identity and visibility, connected asset identity and visibility, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   deploying, by a device executing a service, a first service connector to a first deployment network of a first organization of a supply chain and a second service connector to a second deployment network of a second organization of the supply chain, wherein the first service connector and the second service connector are configured to capture item-related data via an item identification device of the first organization and an item identification device of the second organization, respectively;
   receiving, at the device, a selected visibility offering by the first organization, the selected visibility offering comprising information published about items from the first organization;
   receiving, at the device, a selected visibility intent for the second organization, the selected visibility intent comprising information requested about items by the second organization;
   determining, by the device, a data sharing policy by matching the selected visibility offering by the first organization to the selected visibility intent for the second organization; and
   configuring, by the device and based on one or more item identification technologies utilized by the first organization and plugin data of the first organization, the first service connector by constructing a software element of the first service connector which, once instantiated, is caused to interface with one or more endpoint devices or networking equipment via the plugin data to capture item-related data specified by the data sharing policy using the one or more item identification technologies and provide that item-related data to the second service connector,
   wherein the one or more item identification technologies comprise one or more of: a barcode scanner, a radio frequency identification (RFID) tag scanner, a Bluetooth Low Energy (BLE) tag scanner, or an ultrawideband (UWB) tag scanner, and
   wherein the plugin data is associated with one or more of: an enterprise resource planning (ERP) system, a warehouse management system (WMS), a warehouse execution system (WES), or a transport management system (TMS).

2. The method as in claim 1, wherein the item-related data specified by the data sharing policy is indicative of an event associated with a particular item that was shipped from the second organization to the first organization.

3. The method as in claim 2, wherein the event comprises one of: the particular item being received by the second organization or the particular item being sent by the second organization.

4. The method as in claim 1, wherein the device determines the data sharing policy further in part by matching the selected visibility offering by the first organization to a selected visibility intent for a third organization of the supply chain, wherein the first organization, the second organization, and the third organization are selected from a group consisting of: a manufacturer, a warehouse, and a transporter operable to transport items from the manufacturer to the warehouse.

5. The method as in claim 4, wherein the device configures the first service connector to provide the item-related data specified by the data sharing policy to a third service connector deployed to a third deployment network of the third organization.

6. The method as in claim 1, wherein receiving the selected visibility offering by the first organization comprises:
sending, by the device and to a user interface, a set of different types of data that the first service connector can provide; and
receiving, at the device and from the user interface, a selection of a subset of the set of different types of data that the first service connector can provide.

7. The method as in claim 6, further comprising:
selecting, by the device, the set of different types of data that the first service connector can provide based on a profile associated with the first organization and on a profile associated with the second organization.

8. The method as in claim 1, wherein the one or more endpoint devices or networking equipment comprises at least one of: a BLE beacon, a UWB anchor, a Layer-2 switch, a wireless access point, or a wireless access point controller.

9. The method as in claim 1, wherein the device further configures the first service connector with a signed certificate for authenticating communications of the first service connector.

10. An apparatus, comprising:
one or more interfaces;
a processor coupled to the one or more interfaces and configured to execute one or more processes; and
a memory configured to store a process that is executable by the processor, the process when executed configured to:
deploy a first service connector to a first deployment network of a first organization of a supply chain and a second service connector to a second deployment network of a second organization of a supply chain, wherein the first service connector and the second service connector are configured to capture item-related data via an item identification device of the first organization and an item identification device of the second organization, respectively;
receive a selected visibility offering by the first organization, the selected visibility offering comprising information published about items from the first organization;
receive a selected visibility intent for the second organization, the selected visibility intent comprising information requested about items by the second organization;
determine a data sharing policy by matching the selected visibility offering by the first organization to the selected visibility intent for the second organization; and
configure, based on one or more item identification technologies utilized by the first organization and plugin data of the first organization, the first service connector by constructing a software element of the first service connector which, once instantiated, is caused to interface with one or more endpoint devices or networking equipment via the plugin data to capture item-related data specified by the data sharing policy using the one or more item identification technologies and provide that item-related data to the second service connector,
wherein the one or more item identification technologies comprise one or more of: a barcode scanner, a radio frequency identification (RFID) tag scanner, a Bluetooth Low Energy (BLE) tag scanner, or an ultrawideband (UWB) tag scanner, and
wherein the plugin data is associated with one or more of: an enterprise resource planning (ERP) system, a warehouse management system (WMS), a warehouse execution system (WES), or a transport management system (TMS).

11. The apparatus as in claim 10, wherein the item-related data specified by the data sharing policy is indicative of an event associated with a particular item that was shipped from the second organization to the first organization.

12. The apparatus as in claim 11, wherein the event comprises one of: the particular item being received by the second organization or the particular item being sent by the second organization.

13. The apparatus as in claim 10, wherein the apparatus determines the data sharing policy further in part by matching the selected visibility offering by the first organization to a selected visibility intent for a third organization of the supply chain, wherein the first organization, the second organization, and the third organization are selected from a group consisting of: a manufacturer, a warehouse, and a transporter operable to transport items from the manufacturer to the warehouse.

14. The apparatus as in claim 13, wherein the apparatus configures the first service connector to provide the item-related data specified by the data sharing policy to a third service connector deployed to a third deployment network of the third organization.

15. The apparatus as in claim 10, wherein the apparatus receives the selected visibility offering by the first organization by:
sending, to a user interface, a set of different types of data that the first service connector can provide; and
receiving, from the user interface, a selection of a subset of the set of different types of data that the first service connector can provide.

16. The apparatus as in claim 15, wherein the process when executed is further configured to:
select the set of different types of data that the first service connector can provide based on a profile associated with the first organization and on a profile associated with the second organization.

17. A tangible, non-transitory, computer-readable medium storing program instructions that cause a device to execute a process comprising:
deploying, by the device, a first service connector to a first deployment network of a first organization of a supply chain and a second service connector to a second deployment network of a second organization of a supply chain, wherein the first service connector and the second service connector are configured to capture item-related data via an item identification device of the first organization and an item identification device of the second organization, respectively;

receiving, at the device, a selected visibility offering by the first organization, the selected visibility offering comprising information published about items from the first organization;

receiving, at the device, a selected visibility intent for the second organization, the selected visibility offering comprising information published about items from the first organization;

determining, by the device, a data sharing policy by matching the selected visibility offering by the first organization to the selected visibility intent for the second organization; and configuring, by the device and based on one or more item identification technologies utilized by the first organization and plugin data of the first organization, the first service connector by constructing a software element of the first service connector which, once instantiated, is caused to interface with one or more endpoint devices or networking equipment via the plugin data to capture item-related data specified by the data sharing policy using the one or more item identification technologies and provide that item-related data to the second service connector, wherein the one or more item identification technologies comprise one or more of: a barcode scanner, a radio frequency identification (RFID) tag scanner, a Bluetooth Low Energy (BLE) tag scanner, or an ultrawideband (UWB) tag scanner, and wherein the plugin data is associated with one or more of: an enterprise resource planning (ERP) system, a warehouse management system (WMS), a warehouse execution system (WES), or a transport management system (TMS).

* * * * *

UNITED STATES PATENT AND TRADEMARK OFFICE
CERTIFICATE OF CORRECTION

PATENT NO. : 11,829,924 B2
APPLICATION NO. : 17/147152
DATED : November 28, 2023
INVENTOR(S) : Marcelo Yannuzzi et al.

It is certified that error appears in the above-identified patent and that said Letters Patent is hereby corrected as shown below:

In the Specification

Column 4, Line 8 please amend as shown:
simplified computer network 100 illustratively comprising Column 6, Line 10 please amend as shown:
requires both organizations to use the same software or for Column 8, Line 51 please amend as shown:
visibility process 248 may be used to set up a federation in other Column 11, Line 45 please amend as shown:
eration & visibility process 248 may also suggest invitees to the Signed and Sealed this
Twentieth Day of February, 2024

Katherine Kelly Vidal
*Director of the United States Patent and Trademark Office*